United States Patent
Curtin et al.

(10) Patent No.: US 12,143,533 B2
(45) Date of Patent: *Nov. 12, 2024

(54) COMMUNICATIONS PROCESSING

(71) Applicant: American TEL-A-Systems, Inc., McFarland, WI (US)

(72) Inventors: Thomas V. Curtin, Madison, WI (US); Kevin Mark Beale, Stoughton, WI (US); Paul L. Hansen, McFarland, WI (US); Wayne Paul Waldner, Richland Center, WI (US)

(73) Assignee: AMERICAN TEL-A-SYSTEMS, INC., McFarland, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/553,025

(22) Filed: Dec. 16, 2021

(65) Prior Publication Data

US 2022/0109756 A1 Apr. 7, 2022

Related U.S. Application Data

(63) Continuation of application No. 16/774,881, filed on Jan. 28, 2020, now Pat. No. 11,258,904.

(51) Int. Cl.
*H04M 3/523* (2006.01)

(52) U.S. Cl.
CPC .................. *H04M 3/523* (2013.01)

(58) Field of Classification Search
CPC ...................................... H04M 3/523
USPC ....................................... 370/259
See application file for complete search history.

(56) References Cited

U.S. PATENT DOCUMENTS

| | | |
|---|---|---|
| 6,618,477 B1 | 9/2003 | Lambiase |
| 6,661,882 B1 | 12/2003 | Muir et al. |
| 6,741,697 B2 | 5/2004 | Benson et al. |
| 7,099,449 B1 | 8/2006 | Rogers et al. |
| 8,363,814 B2 | 1/2013 | Shaffer et al. |
| 8,437,457 B1 | 5/2013 | Amos et al. |
| 8,488,774 B2 | 7/2013 | Mahalaha et al. |

(Continued)

FOREIGN PATENT DOCUMENTS

GB 2522710 A 8/2015

*Primary Examiner* — Binh Kien Tieu
(74) *Attorney, Agent, or Firm* — Baker Botts L.L.P.

(57) ABSTRACT

A system is disclosed. The system comprises a service platform associated with a call center, the service platform comprising an applications server configured to communicatively couple to a softswitch and a database. The applications server is configured to receive an inbound communication, determine a source of the inbound communication, and identify one or more configuration parameters associated with a destination of the inbound communication, the destination of the inbound communication associated with a client of the call center. The applications server is configured to route the inbound communication to an agent associated with the call center to establish a communication session. The applications server is configured to send, to the client based on the one or more configuration parameters associated with the destination of the inbound communication, a notification that the inbound communication was received, the notification identifying the source of the inbound communication.

15 Claims, 3 Drawing Sheets

(56) References Cited

U.S. PATENT DOCUMENTS

| | | | |
|---|---|---|---|
| 8,582,475 B1* | 11/2013 | Marghescu | H04M 3/5183 379/265.09 |
| 8,755,503 B1 | 6/2014 | Kirchhoff et al. | |
| 9,313,328 B2 | 4/2016 | Vendrow et al. | |
| 9,406,076 B1* | 8/2016 | Agrawal | G06Q 30/0241 |
| 9,924,036 B2 | 3/2018 | Cutajar | |
| 10,110,749 B1* | 10/2018 | Haggerty | H04M 3/42102 |
| 10,129,394 B2 | 11/2018 | Conway et al. | |
| 10,701,204 B2* | 6/2020 | Corfield | H04M 15/88 |
| 10,862,929 B2 | 12/2020 | O'Connor et al. | |
| 11,258,904 B2* | 2/2022 | Curtin | H04M 3/523 |
| 2006/0141926 A1* | 6/2006 | Anttilla | H04M 1/663 455/3.06 |
| 2007/0160035 A1* | 7/2007 | Altberg | H04M 15/09 370/352 |
| 2008/0310399 A1 | 12/2008 | Narayanan et al. | |
| 2009/0103701 A1* | 4/2009 | Garg | H04M 3/436 379/142.04 |
| 2011/0200181 A1 | 8/2011 | Issa et al. | |
| 2016/0050320 A1 | 2/2016 | Montenegro et al. | |
| 2016/0381091 A1* | 12/2016 | O'Connor | H04L 65/1089 370/260 |
| 2017/0310823 A1* | 10/2017 | N | H04M 3/5141 |
| 2017/0366664 A1 | 12/2017 | Chandra | |
| 2021/0006658 A1 | 1/2021 | Odinak et al. | |
| 2021/0209536 A1* | 7/2021 | Reuveni | G06Q 10/06316 |
| 2021/0272127 A1* | 9/2021 | Mahalle | H04M 3/5141 |

* cited by examiner

COMMUNICATIONS PROCESSING

PRIORITY

This nonprovisional application is a continuation under 35 U.S.C. § 120 of U.S. patent application Ser. No. 16/774,881 filed Jan. 28, 2020 and entitled "Communications Processing" which is hereby incorporated by reference in its entirety.

TECHNICAL FIELD

The present disclosure relates, in general, to wireless communications and, more particularly, to systems and methods for communications processing.

BACKGROUND

Call centers are designed to connect callers to agents or other company representatives for a variety of purposes. For instance, business owners may require call-center services to manage incoming calls or other types of inbound communications, including calls from prospective and existing customers. Customer experiences with call centers are important to the success of the business. For example, if a prospective customer encounters difficulty being connected to the business' sales team, the business owner may lose a sale. For this reason, the ability to quickly and efficiently process calls and other inbound communications is important to the success of the call center.

Systems have been developed to facilitate the handling of incoming calls to a call center. These systems, however, suffer from significant deficiencies. For example, one problem with existing call-center systems is that they fail to notify a client when a call (or other inbound communication) has been received and is being processed by the system. Rather, many existing systems process calls and other inbound communications without informing the client. This can result in a number of problems. For instance, the client may not be made aware that a call was received by the system until after the call or other inbound communication has been processed by the system and the caller's (e.g., a prospective customer) interaction with the call center has ended. This can result in loss of business and diminished customer satisfaction. Thus, there is a need for improved systems and methods of communications processing that notify a client when a communication has been received at a call center.

As another example, existing systems fail to provide the flexibility needed to effectively process calls and other inbound communications. With existing approaches, calls and other inbound communications received at a call center are typically processed in the same way. Oftentimes, however, this one-size-fits-all approach is undesirable. The lack of flexibility in existing systems may result in inappropriate handling of the communication. For instance, calls or other inbound communications that should be prioritized may be delayed, potentially resulting in loss of sales and diminished customer satisfaction. Moreover, requiring that all calls and other inbound communications received at the call center be processed in the same way may place a burden on system and call-center resources and prevent overall optimization of the system (for example, by requiring application of call-flow processes that are not necessary for that particular communication). Thus, there is a need for improved systems and methods of communications processing that provide flexibility and allow inbound communications to be processed in a manner that is suitable for the particular caller and/or call-center client.

SUMMARY

To address the foregoing problems with existing approaches, disclosed is a system. The system comprises a service platform associated with a call center, the service platform comprising an applications server configured to communicatively couple to a softswitch and a database. The applications server is configured to receive an inbound communication. The applications server is configured to determine a source of the inbound communication. The applications server is configured to identify one or more configuration parameters associated with a destination of the inbound communication, the destination of the inbound communication associated with a client of the call center. The applications server is configured to route the inbound communication to an agent associated with the call center to establish a communication session. The applications server is configured to send, to the client based on the one or more configuration parameters associated with the destination of the inbound communication, a notification that the inbound communication was received, the notification identifying the source of the inbound communication.

In certain embodiments, the notification may comprise a link enabling the client to request to join the communication session. The applications server may be further configured to receive, from the client, a request to join the communication session. The applications server may be further configured to join the client in the communication session. In certain embodiments, the applications server may be further configured to assign a unique identifier to the communication session. The request to join the communication session may comprise the unique identifier.

In certain embodiments, the one or more configuration parameters may indicate that the client is to be notified when inbound communications directed to the destination are received at the service platform.

In certain embodiments, the inbound communication may be a first inbound communication. The applications server may be further configured to: subsequently receive a second inbound communication; determine a source of the second inbound communication; and identify one or more configuration parameters associated with a destination of the second inbound communication, the destination of the second inbound communication associated with the client of the call center; determine that the source of the second inbound communication is the same as the source of the first inbound communication; and route the second inbound communication to the client instead of the agent based on the one or more configuration parameters associated with the destination of the second inbound communication. In certain embodiments, the applications server may be further configured to determine that the second inbound communication was received within a predetermined amount of time after the first inbound communication was received. The one or more configuration parameters may indicate that subsequent inbound communications from the same source that are received within the predetermined amount of time should be routed to the client instead of the agent.

In certain embodiments, the agent associated with the call center may comprise one of: an operator; and a speech-enabled intelligent script. In certain embodiments, the inbound communication may comprise one of: a phone call; a video conference call; a text message; and an e-mail.

In certain embodiments, in determining the source of the inbound communication, the application server may be further configured to: determine a telephone number associated with the inbound communication; and access a database record associated with the telephone number, the database record comprising information about an entity associated with the telephone number. The notification may identify the source of the inbound communication using the information about the entity.

Also disclosed is a method. The method comprises receiving an inbound communication at a service platform associated with a call center. The method comprises determining, by the service platform, a source of the inbound communication. The method comprises identifying, by the service platform, one or more configuration parameters associated with a destination of the inbound communication, the destination of the inbound communication associated with a client of the call center. The method comprises routing the inbound communication to an agent associated with the call center to establish a communication session. The method comprises sending, from the service platform to the client, a notification that the service platform has received the inbound communication. The notification is sent based on the one or more configuration parameters associated with the destination of the inbound communication. The notification identifies the source of the inbound communication.

In certain embodiments, the notification may comprise a link enabling the client to request to join the communication session. The method may comprise receiving, from the client, a request to join the communication session. The method may further comprise joining the client in the communication session. In certain embodiments, the method may comprise assigning, by the service platform, a unique identifier to the communication session. The request to join the communication session may comprise the unique identifier.

In certain embodiments, the one or more configuration parameters may indicate that the client is to be notified when inbound communications directed to the destination are received at the service platform.

In certain embodiments, the inbound communication may be a first inbound communication. The method may comprise subsequently receiving a second inbound communication at the service platform associated with the call center. The method may comprise determining, by the service platform, a source of the second inbound communication. The method may comprise identifying, by the service platform, one or more configuration parameters associated with a destination of the second inbound communication, the destination of the second inbound communication associated with the client of the call center. The method may comprise determining, by the service platform, that the source of the second inbound communication is the same as the source of the first inbound communication. The method may comprise routing the second inbound communication to the client instead of the agent based on the one or more configuration parameters associated with the destination of the second inbound communication.

In certain embodiments, the method may comprise determining that the second inbound communication was received within a predetermined amount of time after the service platform received the first inbound communication. The one or more configuration parameters may indicate that subsequent inbound communications from the same source that are received within the predetermined amount of time should be routed to the client instead of the agent.

In certain embodiments, the agent associated with the call center may comprise one of: an operator; and a speech-enabled intelligent script. In certain embodiments, the inbound communication may comprise one of: a phone call; a video conference call; a text message; and an e-mail.

In certain embodiments, determining the source of the inbound communication may comprise: determining, by the service platform, a telephone number associated with the inbound communication; and accessing, by the service platform, a database record associated with the telephone number, the database record comprising information about an entity associated with the telephone number. In certain embodiments, the notification may identify the source of the inbound communication using the information about the entity.

Also disclosed is a non-transitory computer-readable medium comprising instructions that, when executed by a processor, are configured to perform a method. The method comprises receiving an inbound communication at a service platform associated with a call center. The method comprises determining, by the service platform, a source of the inbound communication. The method comprises identifying, by the service platform, one or more configuration parameters associated with a destination of the inbound communication, the destination of the inbound communication associated with a client of the call center. The method comprises routing the inbound communication to an agent associated with the call center to establish a communication session. The method comprises sending, from the service platform to the client, a notification that the service platform has received the inbound communication. The notification is sent based on the one or more configuration parameters associated with the destination of the inbound communication. The notification identifies the source of the inbound communication.

In certain embodiments, the inbound communication may be a first inbound communication. The method may comprise subsequently receiving a second inbound communication at the service platform associated with the call center. The method may comprise determining, by the service platform, a source of the second inbound communication. The method may comprise identifying, by the service platform, one or more configuration parameters associated with a destination of the second inbound communication, the destination of the second inbound communication associated with the client of the call center. The method may comprise determining, by the service platform, that the source of the second inbound communication is the same as the source of the first inbound communication. The method may comprise routing the second inbound communication to the client instead of the agent based on the one or more configuration parameters associated with the destination of the second inbound communication.

Certain embodiments of the present disclosure may provide one or more technical advantages. For example, certain embodiments may advantageously provide for more efficient call processing. As another example, certain embodiments may advantageously provide for timely notifying a client that an inbound communication has been received and is being processed. As still another example, certain embodiments may advantageously enable the client to quickly join a communication session with the caller and/or an agent. As yet another example, certain embodiments may advantageously enable subsequent calls to be routed to the client directly, bypassing the agent and thereby conserving system and call-center resources. As another example, certain embodiments may advantageously provide increased flexibility, for instance by allowing the client to choose configuration parameters for call processing that most effectively meet the client's needs. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
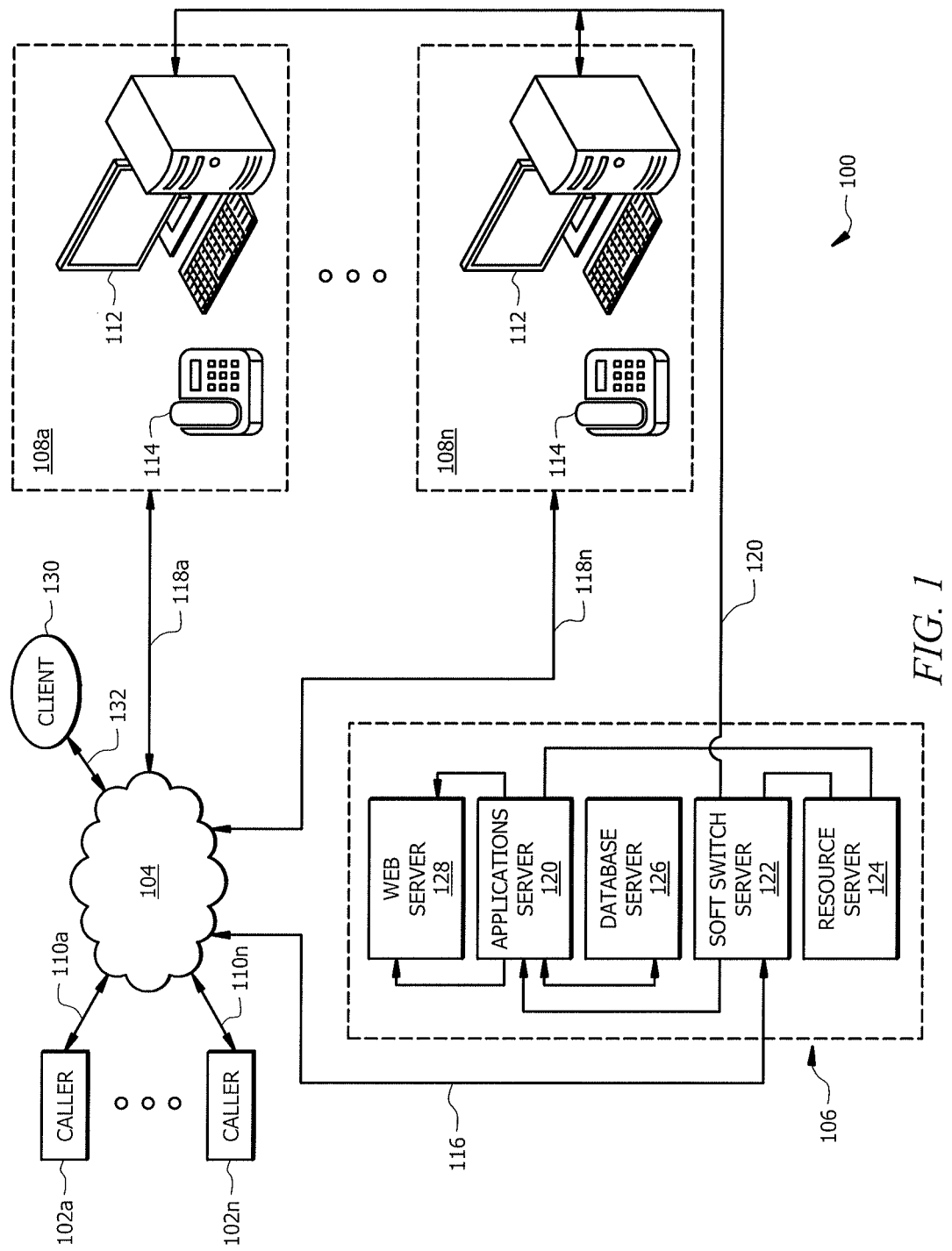
FIG. 1 is a block diagram of an example communication system, in accordance with certain embodiments.

As described above, systems have been developed to facilitate the handling of incoming calls to a call center. These systems, however, suffer from a number of significant deficiencies. First, existing systems fail to notify a client when a call (or other inbound communication) has been received and is being processed by the call-center system. This can result in loss of sales and diminished customer satisfaction, for example where the client is not made aware of the communication until after the system has processed the call and the caller's interaction with the call center has ended. Moreover, the lack of flexibility in existing systems can result in inappropriate handling of the communication by the call center. Calls or other inbound communications that should be prioritized may be delayed, potentially resulting in loss of sales and diminished customer satisfaction. Such a one-size-fits-all approach can burden system and call-center resources and prevent optimizations.

The present disclosure contemplates various embodiments that may address these and other deficiencies associated with existing approaches. According to one example embodiment, a system is disclosed. The system comprises a service platform associated with a call center. The service platform comprises an applications server configured to communicatively couple to a softswitch and a database. The applications server is configured to receive an inbound communication and determine a source of the inbound communication. The applications server is configured to identify one or more configuration parameters associated with a destination of the inbound communication, the destination of the inbound communication associated with a client of the call center. The applications server is configured to route the inbound communication to an agent associated with the call center to establish a communication session. The applications server is configured to send, to the client based on the one or more configuration parameters associated with the destination of the inbound communication, a notification that the inbound communication was received, the notification identifying the source of the inbound communication.

In certain embodiments, the inbound communication may be a first inbound communication. The applications server may be configured to subsequently receive a second inbound communication. The applications server may be configured to determine a source of the second inbound communication. The applications server may be configured to identify one or more configuration parameters associated with a destination of the second inbound communication, the destination of the second inbound communication associated with the client of the call center. The applications server may be configured to determine that the source of the second inbound communication is the same as the source of the first inbound communication. The applications server may be configured to route the second inbound communication to the client instead of the agent based on the one or more configuration parameters associated with the destination of the second inbound communication.

According to another example embodiment, a method is disclosed. The method may be performed by a service platform of a call center. The service platform receives an inbound communication at a service platform associated with a call center. The service platform determines a source of the inbound communication. The service platform identifies one or more configuration parameters associated with a destination of the inbound communication, the destination of the inbound communication associated with a client of the call center. The service platform routes the inbound communication to an agent associated with the call center to establish a communication session. The service platform sends, to the client, a notification that the service platform has received the inbound communication. The notification is sent based on the one or more configuration parameters associated with the destination of the inbound communication. The notification identifies the source of the inbound communication.

According to other example embodiments, a computer program, a computer program product, and a computer readable storage medium comprising instructions which when executed on a computer perform the above-described method are disclosed.

Various embodiments contemplated by the present disclosure will now be described in more detail with reference to the accompanying drawings. Other embodiments, however, are contained within the scope of the present disclosure, and the disclosed subject matter should not be construed as limited to only the embodiments described herein. Rather, the example embodiments described herein are provided by way of example to convey the scope of the subject matter those of skill in the art.

FIG. 1 is a block diagram of an example communication system 100, in accordance with certain embodiments. More particularly, FIG. 1 illustrates communication system 100 comprising one or more callers 102a-102n, a service platform 106, and one or more operator stations 108a-108n, and one or more clients 130. Although FIG. 1 illustrates one example of communication system 100, it should be understood that this is for purposes of example only and the present disclosure is not limited to the example communication system of FIG. 1. Rather, the present disclosure contemplates that other embodiments of system 100 may be used without departing from the scope of the present disclosure.

In the example embodiment of FIG. 1, callers 102a-102n, service platform 106, operator stations 108a-108n, and client 130 are coupled to network 104 through communications links (as described in more detail below). As used throughout this document, the term "couple" and/or "coupled" refers to any direct or indirect communication between two or more elements, whether or not those elements are in physical contact with one another. For example, each caller 102 may use any computing and/or communication device capable of enabling the communication of information to or from one or more of service platform 106, operator stations 108, and client 130 over network 104. Although referred to herein as a caller, it should be understood that callers 102 are not limited to individuals or devices that initiate a telephone call. Rather, the present disclosure contemplates that callers 102 may engage in a variety of types of communication sessions (e.g., telephone calls, video conferencing, text messaging, web chat, and/or any suitable form of communication). It should also be understood that a caller 102 is not necessarily limited to a party initiating a communication session. For example, in certain embodiments callers 102a-102n may be a calling party or a called party that communicates and/or receives data to and/or from service platform 106, operator stations 108, and/or client 130. Each caller 102 may use, for example, a telephone (e.g., a wireline telephone), a wireless device (e.g., a smartphone), a Voice over Internet Protocol (IP) (VoIP) device, a desktop computer, a laptop computer, a personal digital assistant (PDA), a workstation, a mainframe computer, a mini-frame computer, a web server, or any other suitable computing and/or communicating device.

Network 104 may comprise any suitable wireless network, wireline network, or combination of wireless and wireline networks capable of supporting communication between network elements using ground-based and/or space-based components. For example, network 104 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations.

Service platform 106 receives and/or communicates data (e.g., from or to callers 102a-102n, operator stations 108a-108n, and/or client 130) through network 104 coupled to service platform 106. In the example of FIG. 1, service platform 106 couples to network 104 through communications link 116. In certain embodiments, service platform 106 operates to collect, store, and/or communicate data to and/or from network 104. In certain embodiments, service platform 106 may be configured to integrate with, for example, telephone carriers and private branch exchange (PBX) equipment to provide a stand-alone, fully functional call center environment. In some cases, the carrier and PBX integration may be established using a Session Initiation Protocol (SIP) trunk integration method. In operation, service platform 106 may provide a full suite of call center and enterprise functionality. The various elements of service platform 106 and exemplary functionality of service platform 106 are described in more detail below.

In the example embodiment of FIG. 1, system 100 also includes a plurality of operator stations 108a through 108n. Operator stations 108a through 108n are coupled to service platform 106 through communications link 120. Operator stations 108 are capable of receiving, collecting, storing, and/or communicating data to and/or from network 104. In the example embodiment of FIG. 1, operator stations 108a through 108n are coupled to network 104 through communications links 118a and 118n, respectively.

In certain embodiments, operator stations 108a through 108n may be comprised in a call center. For example, each operator station 108 may be a live agent-based data collection system capable of collecting data from, for example, a caller 102 or client 130. Although operator station 108 is an agent-based system in the example embodiment of FIG. 1, the present disclosure contemplates that other suitable data collection system may be used without departing from the scope of the present disclosure.

As used herein, the term agent should be interpreted broadly to encompass any individual associated with a call center that caller 102 may be connected to, whether as part of an incoming call from caller 102 routed to service platform 106 or as part of an outgoing call transmitted from service platform 106 to caller 102. As non-limiting examples, an agent may refer to an agent working in a call center (e.g., at one of operator stations 108), an employee of an organization associated with service platform 106 and/or operator stations 108, a technician (that may or may not be working remotely from a call center), or any other suitable person or entity. Although certain embodiments may describe an agent as an operator associated with an operator station 108 in a call center, the present disclosure is not limited to such an example embodiment. Rather, the various embodiments described herein may be applied to other suitable scenarios, such as those in which operator stations 108 do not make up a traditional call center (having a plurality of operator stations in one, centralized location). For example, in certain embodiments operator stations 108 may be distributed geographically and may couple to service platform 106 and callers 102 via one or more different networks.

Operator stations 108 may comprise any suitable computing and/or communicating device or combination of devices. In the example embodiment of FIG. 1, each operator station 108 includes a host 112 and a communication device 114. Communication device 114 enables an agent to communicate with caller 102. Communication device 114 may comprise, for example, a telephone, a wireless device, a voice over IP device, or any other computing and/or communicating device or combination of devices. Although the example embodiment of FIG. 1 illustrates host 112 and communication device 114 as separate devices, one device that is capable of performing the desired functionality could be used without departing from the scope of the present disclosure.

Host 112 may comprise, for example, a desktop computer, a laptop computer, a server computer, a personal digital assistant, and/or any other computing or communicating device or combination of devices. In certain embodiments, host 112 may be connected to a PBX-based automated call distribution (ACD) or the ACD of service platform 106. Host 112 may be configured to run software, such as a soft agent. The soft agent may, for example, include a SIP-based soft phone and switch-specific computer telephony integration (CTI) control of the agent state during call handling. The soft agent may provide an interface to service platform 106, and in particular to applications server 120 and softswitch server 122 of service platform 106. Host 112 may include a graphical user interface (GUI) that enables a live agent to collect, enter, process, store, retrieve, amend, and/or dispatch data during the interaction of operator station 108 with a caller 102 (e.g., during a call). Host 112 may run console software that provides, for example, IP-based call handling using the GUI and, for example, an input device (such as a mouse, keyboard, microphone, or other suitable input device).

Each host 112 may be capable of executing and/or displaying one or more intelligent scripts and/or other types of scripts that at least partially contribute to the collection of data from caller 102. As described below, an intelligent script may guide call center agents through call completion steps.

Client 130 may be associated with a business or other entity that has engaged a call center to manage incoming and/or outgoing calls and other types of inbound and/or outbound communications. In certain embodiments, client 130 may configure one or more configuration parameters that service platform 106 may use to process communications. In certain embodiments, client 130 may receive, from service platform 106, notifications that service platform 106 has received an inbound communication, as described in more detail below. In the example of FIG. 1, client 130 is coupled to network 104 through communications link 132. Similar to caller 102 described above, client 130 may use any computing and/or communication device capable of enabling the communication of information to or from one or more of service platform 106, operator stations 108, and callers 102 over network 104. For example, client 130 may use a telephone (e.g., a wireline telephone), a wireless device (e.g., a smartphone), a VoIP device, a desktop computer, a laptop computer, a PDA, a workstation, a mainframe computer, a mini-frame computer, a web server, or any other computing and/or communicating device.

As described above, in the example embodiment of FIG. 1 callers 102a-102n, service platform 106, operator stations 108-108n, and client 130 are coupled to network 104 through various communication links. More particularly, system 100 includes communications links 110, 116, 118, 120 and 132, each operable to facilitate the communication of data to and/or from network 104. Communications links 110, 116, 118, 120, and 132 may include any hardware, software, firmware, or combination thereof. In various embodiments, communications links 110, 116, 118, 120, and 132 may comprise communications media capable of assisting in the communication of analog and/or digital signals. Communications links 110, 116, 118, 120, and 132 may, for example, comprise a twisted-pair copper telephone line, a fiber optic line, a Digital Subscriber Line (DSL), a wireless link, a USB bus, a PCI bus, an ethernet interface, or any other suitable interface operable to assist in the communication of information.

Data may be transmitted over communications links 110, 116, 118, 120, and 132 using any suitable protocol. As non-limiting examples, protocols such as the Real-time Transport Protocol (RTP) and WebRTC may be used. RTP is a network protocol for delivering audio and video over IP networks via streaming. WebRTC is an open framework for the web that enables high quality real-time communication sessions over a network. WebRTC allows for the streaming of audio and/or video media without requiring an intermediary or third-party software. RTP and WebRTC may be particularly useful in the various embodiments described herein, because they can advantageously allow for the receipt of real-time data from the communication session between, for example, caller 102 and an agent associated with an operator station 108, if desired.

As described above, service platform 106 may provide a full suite of call center and enterprise functionality. Service platform 106 may comprise any suitable combination of hardware, software, and/or firmware. In certain embodiments, service platform 106 may comprise any device or combination of devices that may include one or more software and/or firmware modules. In the example embodiment of FIG. 1, service platform 106 includes an applications server 120, a softswitch server 122, a resource server 124, a database server 126, and a web server 128. Although FIG. 1 illustrates a particular arrangement of elements of service platform 106, it should be understood that the present disclosure is not limited to the precise arrangement of the example embodiment of FIG. 1. For example, although FIG. 1 illustrates an example embodiment in which applications server 120, softswitch server 122, resource server 124, database server 126, and web server 128 are incorporated into a single device, the present disclosure is not limited to this example embodiment. In certain embodiments, the elements of service platform 106 may be distributed. In certain embodiments, service platform 106 may contain fewer components than those illustrated in the example embodiment of FIG. 1. Additionally, in certain embodiments service platform 106 may contain any suitable additional components that may provide one or more of the functionalities described herein and/or additional functionality of service platform 106.

Applications server 120 may house one or more applications used by service platform 106. In certain embodiments, applications server 120 may provide a full suite of call center and enterprise applications. Exemplary call center and enterprise applications provided by applications server 120 are described in more detail below.

Softswitch server 122 is coupled to applications server 120 and resource server 124. Softswitch server 122 may house the switching components of service platform 106. For example, softswitch server 122 may include a softswitch. In certain embodiments, the softswitch may be a SIP-based telephony switch. The softswitch may receive inbound phone calls (e.g., from clients 102) and send outgoing call requests (e.g., outbound calls from operator stations 108). The softswitch may provide telephony services to, for example, IP subscribers and traditional PSTN subscribers, for example by supplying the trunking between the IP and PSTN networks. Softswitch server 122 may operate in tandem with applications server 120, resource server 124, database server 126, and web server 128 to provide voice processing and switching resources. For example, softswitch server 122 may provide one or more of intelligent call routing, switch-based configurable call control, multi-lingual voice processing resources, and other suitable functionality. In certain embodiments, softswitch 122 may stream audio to resource server 124 for processing (for example, using the speech recognition functionality of resource server 124, described in more detail below).

Resource server 124 is coupled to applications server 120 and softswitch server 122. Resource server 124 may operate in tandem with one or more of applications server 120, softswitch server 122, database server 126, and web server 128 to provide voice processing resources for service platform 106. For example, resource server 124 may provide a speech recognition engine and voice resources for service platform 106. Resource server 124 may include an automatic speech recognition (ASR) engine capable of processing voice responses, natural language processing, text-to-speech translations, and/or speech-to-text translations in connection with one or more voice-enabled functions of service platform 106. In certain embodiments, resource server 124 can be configured to use one or more customizable grammars to match spoken phrases to, for example, directory listings. Resource server 124 may be configured to receive audio from softswitch server 122 for processing using the speech-recognition functionalities described above.

Database server 126 is coupled to applications server 120. Database server 126 may store information utilized by one or more other elements of service platform 106 (such as applications server 120, softswitch server 122, resource server 124, and web server 128). For example, database server 126 may store one or more of speech-enabled intelligent scripts, intelligent scripts, scripts, prompts, information associated with a user (e.g., called or calling party), selections and data inputs from a user, and any other suitable information. In certain embodiments, database server 126 may use a structured query language (SQL) server database engine for database management, storage, and retrieval. Database server 126 may include memory capable of storing one or more scripts (e.g., speech-enabled intelligent scripts, intelligent scripts, and scripts), data associated with a user's response or responses, information related to previous interactions between a user and service platform 106 and/or a caller and an agent, and/or any other suitable information. The memory may include any hardware, software, firmware, or combination thereof operable to store and facilitate retrieval of information. The memory may store information using any of a variety of data structures, arrangements, and/or compilations. The memory may, for example, include a dynamic random access memory (DRAM), a static random access memory (SRAM), a NAND flash memory, or any other suitable volatile or nonvolatile storage and retrieval device or combination of devices.

In certain embodiments, database server 126 may store information about the source of an inbound communication and/or the destination of an inbound communication. For instance, database server 126 may store information related to one or more of the name, company, occupation, demographic information, contact information (e.g., telephone number, email address), preferred contact methods, preferred contact times, IP address, other identifying information, capability information (e.g., conferencing capabilities, messaging capabilities, types of communication available, etc.), preference information (e.g., language preferences), trusted contacts of a caller 102 (e.g., individuals that are authorized to act on behalf of a caller 102), blacklisted parties (e.g., individuals that are not authorized to act on behalf of a caller 102), and any other suitable information about the source of the inbound communication (e.g., a caller 102). Database server 126 may store analogous information for the destination of the inbound communication (e.g., client 130 that has that has engaged the call center to manage incoming and/or outgoing calls and other types of inbound and/or outbound communications). Database server 126 may also store one or more configuration parameters associated with the destination of the inbound communication (described in more detail below). Additionally, database server 126 may store information about previous interactions that the source of the inbound communication (e.g., a caller 102) has had with service platform 106, an agent or operator, and/or with client 130. For example, for each communication session established via service platform 106, database server 126 may store information related to one or more of the reason for the communication, the disposition of the communication, the duration of the communication, the agent involved in the communication, context information, date and time of the communication, whether a translator was required, any problems associated with the communication, and any other suitable information.

Data stored in database server 126 may be accessible by multiple components of service platform 106 and/or operator stations 108 (including, for example, host 112 described in more detail below). For example, the data stored in database server 126 may be accessible to one or more of applications server 120, softswitch server 122, resource server 124, web server 128, and host 112. Storing data in a memory that is accessible to multiple elements of system 100 can prove advantageous when it is desired to subsequently access and process this information. In certain embodiments, data stored in database server 126 can be used to populate a speech-enabled intelligent script, an intelligent script, and/or any other type of script used by applications server 120 and/or an agent associated with an operator station 108. Populating scripts with data stored in database server 126 can help the intelligent speech-enabled scripts (or an agent using an intelligent scripts) to interact more efficiently with a caller 102. For example, populating a speech-enabled intelligent script and/or a script used by a live agent with data from database server 126 allows the intelligent speech-enabled script or the agent or operator to review the responses previously provided, which may allow the agent to better assist the caller 102. In certain embodiments, data stored in database server 126 can be used in communications processing (e.g., when determining whether or not to notify a client than an inbound communication has been received at service platform 106), as described in more detail below.

Web server 128 provides the web services for service platform 106. In certain embodiments, service platform 106 may include all or some suitable combination of the servers described above, as well as (alternatively or in addition to) other elements configured to perform desired communicating and/or computing functionality.

Each of applications server 120, softswitch server 122, resource server 124, database server 126, and web server 128 may comprise any suitable combination of hardware, software, and firmware. In certain embodiments, one or more of applications server 120, softswitch server 122, resource server 124, database server 126, and web server 128 may include processing circuitry, such as a combination of one or more of a controller, microprocessor, microcontroller, central processing unit, digital signal processor, application-specific integrated circuit, field programmable gate array, or any other suitable computing device, resource, or combination of hardware, software, and/or encoded logic operable to provide the functionality described herein. The processing circuitry may execute instructions stored in device readable medium or in memory to provide the functionality described herein. Applications server 120, softswitch server 122, resource server 124, database server 126, and web server 128 may comprise any form of volatile or non-volatile computer readable memory including, for example, persistent storage, solid-state memory, remotely mounted memory, magnetic media, optical media, random access memory (RAM), read-only memory (ROM), mass storage media (for example, a hard disk), removable storage media (e.g., a flash drive, a Compact Disk (CD) or a Digital Video Disk (DVD)), and/or any other volatile, non-transitory device readable and/or computer executable memory devices that store information, data, and/or instructions that may be used by the processing circuitry. The memory may store any suitable instructions, data or information, including a computer program, software, an application including one or more of logic, rules, code, tables, etc. and/or other instructions capable of being executed by the processing circuitry to perform the various functionalities described herein. The memory may store responses written to memory by a script, such as an intelligent script or speech-enabled intelligent script. In some cases, the processing circuitry and device readable medium may be considered to be integrated.

In certain embodiments, one or more of applications server 120, softswitch server 122, resource server 124, database server 126, and web server 128 may run on dedicated servers. In other embodiments, one or more of applications server 120, softswitch server 122, resource server 124, database server 126, and web server 128 may run in a virtual server environment. Running applications server 120, softswitch server 122, resource server 124, database server 126, and web server 128 in a virtual server deployment may advantageously reduce the number of servers needed and provide greater flexibility in terms of redundancy and ease of deployment.

As described above, applications server 120 may house one or more applications used by service platform 106 to provide a full suite of call-center and enterprise applications. For example, applications server 120 may provide for ACD, such as skills-based routing ACD. This may advantageously enable service platform 106 to provide for functionality such as priority call routing, overflow, integral voice processing, reporting, and server-based PBX integration. In certain embodiments, applications server 120 may determine how incoming and/or outgoing calls should be routed, and provide instructions to softswitch server 122 to route calls in a particular manner.

As another example, applications server 120 may provide scripting functionality (e.g., intelligent scripting and/or speech-enabled intelligent scripting functionality). An intelligent script guides users through call completion steps, work flow steps, and messaging steps. Intelligent scripts can be built for call center agents, operators, and web and mobile users. Similarly, intelligent scripts guide call center agents through call completion steps. In certain embodiments, an intelligent script presents the appropriate options for each call type an agent handles, eliminating errors and reducing training time. One exemplary use of intelligent scripts is healthcare code calls. Call scripts guide agents through the specific requirements for code calls, eliminating errors, ensuring the codes are completed quickly, and self-documenting all steps taken to complete each code call.

Intelligent scripts may contain any number of elements, actions, and screens. In certain embodiments, a script designer enables an administrator (e.g., a call center administrator) to create any number of intelligent scripts. In certain embodiments, client 130 may be able to use a scripting engine to generate any number of intelligent scrips in a similar manner. Each script may have a unique flow to present the elements, actions, and screens in the preferred order for each scenario. Branching and decision trees may be available within the scripts to customize the flow of elements based on selections, date/time, or data. In one particular non-limiting example, a script can comprise a series of queries requesting information and/or data from a user (e.g., a caller) of service platform 106. In some cases, intelligent scripts may include, for example, an HTML-based script, an XML-based script, a JSON-based script, or a combination of these or other scripting formats. Intelligent scripts may comprise, for example, software, firmware, code, portions of code, data compilations, and/or a combination of these or any other type of data.

Speech-enabled intelligent scripts enable users (e.g., a caller 102) to interact with intelligent scripts without agent involvement. Phone users are guided through scripts using pre-recorded prompts, voice menus, and text-to-speech menus. Phone users make selections and input data (e.g., using Dual Tone-Multi Frequency (DTMF) entry or speech recognition entry). In certain embodiments, the entire intelligent script may be speech-enabled. In certain embodiments, the script designer (e.g., a call center administrator or client 130) may enable the administrator to choose which entries are to be speech-enabled. In certain embodiments, the speech-enabled intelligent script (or a section thereof) may include prompts and/or questions similar to those in the intelligent script provided to the agent. In certain embodiments, the elements and/or actions of the speech-enabled intelligent script may be the same as the intelligent script provided to the agent. In some cases, the script prompts and/or questions may be pre-configured. In other cases, the script prompts and/or questions may change dynamically based on previous call interactions and/or other data stored in database server 126. Speech-enabling intelligent scripts may advantageously create an opportunity to have a single script that presents speech-enabled input for a portion of the script, and screen-enabled input for another portion of the script.

Applications server 120 may provide various voice services (alone or in combination with, for example, one or more of softswitch server 122 and resource server 124). For instance, applications server 120 may provide call center functions such as playing greetings to callers with multi-level navigation menus, playing automated call queuing announcements, playing automated agent greetings, automated call recording and playback, and other suitable functions. In certain embodiments, applications server 120 may provide for automated outbound phone calls (e.g., calls to one or more of clients 102) with messages played using integrated text-to-speech.

Other examples of services that service platform 106 provides may include (but are not limited to): call routing; call monitoring; database driven scripted messages (including intelligent speech-enabled scripts described above); call recording; directory services; status, event, on-call, and workforce scheduling tools; and event-driven statistical and analytical reporting for console operators as well as enterprise web users.

In certain embodiments, applications server 120 may be configured to notify a client that an inbound communication has been received at service platform 106 and is being processed. For instance, a caller 102 (e.g., caller 102a) may initiate a communication using a computing and/or communication device. Any suitable method of communication may be used. For example, the inbound communication may be a phone call, a video conference call, a text message, an e-mail, a web chat, or any other suitable type of communication. The destination of the communication is associated with a client of the call center (e.g., client 130). For example, in the case of a telephone call, the called number may be associated with the call center responsible for handling inbound communications to the client's business. The communication is routed (e.g., via network 104 in the example embodiment of FIG. 1) to service platform 106.

Applications server 120 is configured to receive the inbound communication (e.g., directly or via softswitch server 122). Applications server 120 is configured to determine a source of the inbound communication. Applications server 120 may determine the source of the inbound communication in any suitable manner. As one example, if the inbound communication is a telephone call or a text message, applications server 120 may be configured to use automatic number identification (ANI) to determine the telephone number of the calling/texting party. Applications server 120 may use this information to determine the source of the inbound communication. For instance, applications server 120 may use the determined telephone number to query database server 126. As described above, database server 126 may store information associated with caller 102a. In response to the query from applications server 120, database server 126 may return information associated with the telephone number used for the query, including information about the source of the inbound communication (in this example, caller 102a). For example, database server 126 may provide information about the calling/texting party's name, business, relationship to client 130, or any other suitable information.

For other types of inbound communications, applications server 120 may use a similar process to determine the source of the inbound communication. For instance, depending on the type of inbound communication, applications server 120 may determine identifying information for the source of the communication (e.g., an IP address, e-mail address, or other identifying information of the source of the inbound communication). Applications server 120 may use the obtained information to query database server 126 and obtain information regarding the source of the communication (e.g., caller 102*a*) as described above.

Applications server 120 is configured to identify one or more configuration parameters associated with the destination of the inbound communication (e.g., client 130 that has employed the call center to process inbound communications). As described above, the destination of the inbound communication may be associated with a client of the call center. The one or more configuration parameters may be any suitable information that applications server 120 may use to process the inbound communication. For example, the one or more configuration parameters may indicate that client 130 is to be notified when an inbound communication directed to the destination is received by service platform 106. As another example, the one or more configuration parameters may indicate that subsequent inbound communications from the same source, or subsequent inbound communications from the same source that are received within a predetermined amount of time, should be routed directly to client 130 instead of an agent.

In certain embodiments, the one or more configuration parameters may be configured by client 130. This may be particularly advantageous because it enables communications to be processed in accordance with the particular needs of client 130. In certain embodiments, a default set of one or more configuration parameters may be used.

The present disclosure contemplates that other types of configuration parameters may be used in addition to or as alternatives to the examples described above. For example, the one or more configuration parameters may indicate how various types of inbound communications should be processed when they are received at service platform 106. As another example, the one or more configuration parameters may indicate how inbound communications received at a particular time of day (e.g., mornings, afternoons, evenings, weekends) should be processed. In some cases, the one or more configuration parameters may be more granular (e.g., indicating specific communication processing steps for inbound communications received within a specific window of time on a given day, such as between 2:00 pm and 4:00 pm every other Thursday). As still another example, the one or more configuration parameters may indicate that calls from a particular source (e.g., caller 102, which may be a prospective customer) should always be routed directly to client 130 rather than an agent. As yet another example, the one or more configuration parameters may indicate that applications server 120 should use predictive intelligence to determine whether or not to notify client 130 that the inbound communication has been received.

Applications server 120 is configured to route the inbound communication to an agent associated with the call center to establish a communication session. In certain embodiments, the agent associated with the call center may be an operator. In certain embodiments, the agent associated with the call center may be a speech-enabled intelligent script. In certain embodiments, the inbound communication may be routed to an operator if one is available. If an operator is not available, the inbound communication may be routed to a speech-enabled intelligent script.

In certain embodiments, applications server 120 may be configured to assign a unique identifier to each communication session. For instance, applications server 120 may be configured to assign a numerical, alphabetical, or alphanumeric sequence to the communication session. Applications server 120 may use the assigned identifier to distinguish the communication session from other pending and/or previously-established communication sessions. In certain embodiments, the identifier may be unique in that it is different from any identifier assigned to any other pending communication session. In certain embodiments, the identifier may be unique in that it is different from any identifier previously assigned to a communication session by applications server 120. Applications server 120 may be configured to use the unique identifier to associate future processing steps with the communication session, as described in more detail below.

Applications server 120 is configured to send, to client 130 based on the one or more configuration parameters associated with the destination of the inbound communication (e.g., client 130), a notification that the inbound communication was received. As described above, the one or more configuration parameters may indicate that client 130 is to be notified when inbound communications directed to the destination are received at service platform 106. In certain embodiments, applications server 120 may be configured to send the notification to client 130 before the inbound communication is routed to an agent associated with the call center to establish a communication session. In certain embodiments, applications server 120 may be configured to send the notification to client 130 at substantially the same time as the inbound communication is routed to an agent associated with the call center to establish a communication session. In certain embodiments, applications server 120 may be configured to send the notification to client 130 after the inbound communication is routed to an agent associated with the call center to establish a communication session.

The notification may be sent in one or more of a variety of formats, which may vary according to implementation. For example, in certain embodiments the notification may be a push notification from an app associated with the call center (e.g., a secure messaging app), an email, a text message, an outgoing call that presents a voice prompt when answered, a fax, a paging message, or other suitable type of notification. In some cases, more than one type of notification may be used (e.g., an email and a text message may be sent).

In certain embodiments, the notification identifies the source of the inbound communication (e.g., caller 102*a*). The notification may identify the source of the inbound communication in any suitable manner. In certain embodiments, the notification may include information associated with caller 102*a* obtained from database server 126. For instance, the notification may include one or more of the name, business, and title of caller 102*a*, and/or any other suitable identifying information for caller 102*a*. In certain embodiments, the notification may include other information obtained from database server 126. For example, the notification may include information about previous interactions with caller 102*a* (e.g., the reason that caller 102*a* previously interacted with service platform 106 and information about the disposition of the previous interaction).

In certain embodiments, the notification may enable client 130 to request to join the communication session. For example, the notification may include a link (e.g., a uniform resource locator (URL)) or button enabling client 130 to request to join the communication session. In the case of a prerecorded voice prompt, client 130 may be prompted to press a telephone key to join the call. By selecting the link or button (or providing any other suitable type of input), client 130 may cause a request to be sent to applications server 120 requesting to join the communication session. In certain embodiments, the request to join the communication session may include the unique identifier assigned to the communication session by applications server 120.

Applications server 120 is configured to receive, from client 130, a request to join the communication session. In certain embodiments, applications server 120 may be configured to use the unique identifier for the communications session to associate the request with the communication session established between caller 102a and the agent associated with the call center. Client 130 may join the communication session in a variety of ways. For example, in certain embodiments applications server 120 (alone or in combination with softswitch server 122 and/or one or more other elements of service platform 106) may join client 130 in the communication session so that client 130 can immediately participate in the communication session between caller 102a and the agent associated with the call center. In some cases, this is achieved by using an automated conference invitation that allows the client to join the communication session using a conference bridge associated with the call center. In certain embodiments, applications server 120 may, in response to the request, initiate a communication session via a secure messaging app associated with the call center to allow client 130 to join the communication session.

By notifying client 130 that the inbound communication has been received, and by enabling client 130 to request to join and join the communication session, service platform 106 advantageously enables caller 102 and client 130 to be connected more quickly. This is especially advantageous in scenarios in which the inbound communication is urgent and/or concerning an especially important matter.

In certain embodiments, applications server 120 may determine whether to notify client 130 using predictive intelligence. In some cases, whether or not applications server 120 should use predictive intelligence to determine whether or not to notify client 130 may be indicated by one of the one or more configuration parameters described above. As described above, database server 126 may be configured to store information about previous interactions with caller 102. Applications server 120 may be configured to use the information about previous interactions (alone or in combination with other information, such as preference information) to self-learn and adjust as calls are processed. Applications server 120 employing predictive intelligence functionality may be configured to use one or more of the various information sources described above to predict a preferred behavior for subsequent calls.

In certain embodiments, the inbound communication may be a first inbound communication. Applications server 120 may be configured to subsequently receive a second inbound communication from caller 102a. Applications server 120 may be configured to identify one or more configuration parameters associated with a destination of the second inbound communication (e.g., as described above). The destination of the second inbound communication may be associated with the client of the call center (e.g., client 130). Applications server 120 is configured to determine that the source of the second inbound communication is the same as the source of the first inbound communication (in this example, caller 102a). Applications server 120 may be configured to route the second inbound communication directly to client 130 instead of the agent based on the one or more configuration parameters associated with the destination of the second inbound communication. This may advantageously enable caller 102a and client 130 to establish communication more quickly and optimize the use of system and call-center resources by avoiding tying up operators and using system resources to process speech-enabled intelligent scripts and/or intelligent scripts.

As described above, in certain embodiments the one or more configuration parameters may indicate that subsequent inbound communications from the same source that are received within the predetermined amount of time should be routed to the client instead of the agent. In such a scenario, applications server 120 may be configured to determine that the second inbound communication was received within a predetermined amount of time after the first inbound communication was received.

In certain embodiments, applications server 120 may be configured to perform additional and/or alternative call processing steps according to the one or more configuration parameters associated with the destination of the inbound communication (e.g., client 130). For instance, the one or more configuration parameters may indicate that all inbound communications received from a particular source (e.g., caller 102n) should be routed directly to client 130, bypassing any agent involvement (whether an operator or speech-enabled intelligent script). In such a scenario, applications server 120 may be configured to receive an inbound communication, determine that the source of the inbound communication is caller 102n, identify one or more configuration parameters associated with the destination of the inbound communication (e.g., client 130), and route the inbound communication to client 130 directly based on the identified one or more configuration parameters.

It should be appreciated that although certain functions of applications server 120 have been described above, these functions are described for purposes of example only. The present disclosure is not limited to the example embodiments described herein. In practice, applications server 120 may provide only a subset of the above-described functions, and in some cases applications server 120 may provide other suitable functionality for service platform 106.

Although certain exemplary embodiments have been described above in the context of handling an incoming telephone call, it should be understood that the present disclosure is not limited to these example embodiments. Rather, the present disclosure contemplates that the various embodiments described herein may be applied to other forms of communication including, but not limited to, text messaging, web chat, video conferencing, and any other suitable mode of communication. For example, the various embodiments described herein may be applied to multimedia communications. According to one example embodiment, a communication session may be established over a network, such as network 104, capable of delivering real-time audio and/or video media over IP networks using, for example, RTP and/or WebRTC. According to another example embodiment, a caller 102 may establish a communication session with an agent (e.g., an agent associated with a host 112 described above) using one of the above-described exemplary forms of multimedia communication or another suitable form of communication. For instance, in certain embodiments caller 102a may visit a web site associated with a company utilizing a call center including service platform 106 described above. In some cases, the web site may include a "Contact Us" button or other suitable mechanism to enable the user to initiate a communication session with an agent (e.g., via one of the forms of multimedia communication described above). As an alternative, the web site may include an automated prompt presented to the user to enable the user to establish a communication session with the agent (e.g., a chat, text, or video conversation). In these scenarios, applications server 120 may be configured to determine the source of the inbound communication using any suitable information, including, for example, an IP address, uniform resource locator (URL). Regardless of type, it should be understood that the inbound communication may be processed in accordance with the principles of the various embodiments described herein.

Additionally, although certain exemplary embodiments have been described in the context of inbound communications, the present disclosure is not limited to these example embodiments. Rather, the present disclosure contemplates that the principles of the various embodiments described herein may be applied to outgoing communications (e.g., telephone calls, text message, or web chats) initiated at the call center and directed to a caller 102. For instance, applications server 120 may apply the functionality described herein to notify client 130 when a communication session initiated at the call center (e.g., by an agent associated with the call center) is established with a called party (e.g., a caller 102). In such a scenario, applications server 120 may be configured to identify one or more configuration parameters associated with the source of the outbound communication (in this case, an agent associated with the call center acting on behalf of client 130) and send a notification to client 130 based on the one or more configuration parameters, for example as described above. In such a scenario, the one or more configuration parameters may be configured by client 130 and indicate if and when client 130 should be notified.

Figure 2:
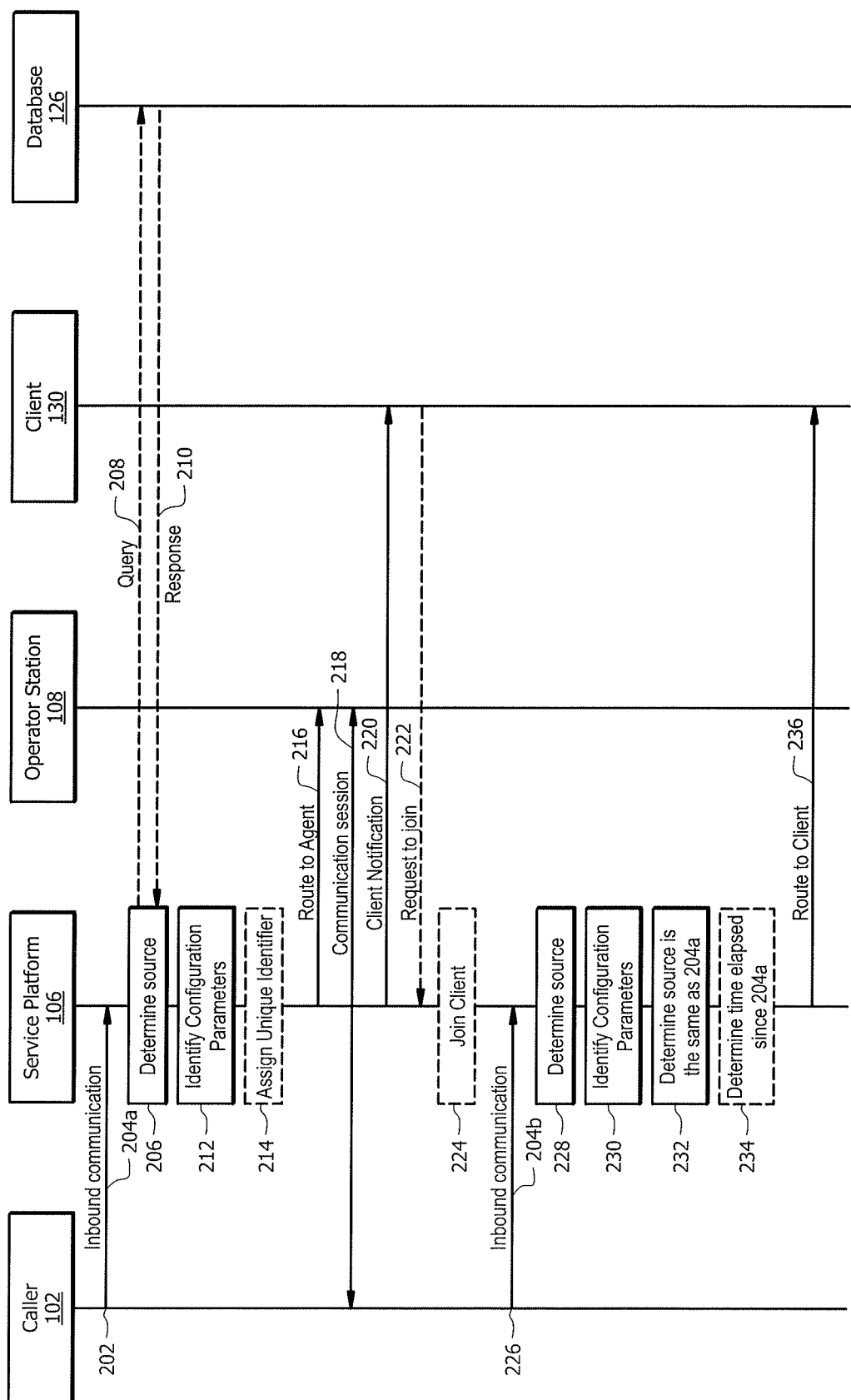
FIG. 2 is a signal flow diagram of an exemplary technique for communications processing, in accordance with certain embodiments.

FIG. 2 is a signal flow diagram of an exemplary technique for communications processing, in accordance with certain embodiments. In particular, FIG. 2 illustrates an exchange of signals among caller 102, service platform 106, operator station 108, client 130, and database server 126. In certain embodiments, one or more of the steps described as performed by service platform 106 may be performed by an applications server (such as applications server 120 described above in relation to FIG. 1). Although database server 126 is illustrated separately in the signal flow diagram of FIG. 2, this is for purposes of explanation only and is not intended to limit the scope of the present disclosure. Rather, as described above in relation to FIG. 1, database server 126 may, in certain embodiments, may be incorporated in service platform 106 or be hosted remotely.

At step 202, inbound communication 204a is received at service platform 106 from caller 102. In certain embodiments, inbound communication 204a may be one of: a phone call; a video conference call; a text message; and an e-mail.

At step 206, service platform 106 determines a source of inbound communication 204a. In certain embodiments, in determining the source of inbound communication 204a, service platform 106 may determine a telephone number associated with inbound communication 204a (or other suitable identifying information). In certain embodiments, at step 208 service platform 106 queries database server 126 using the determined telephone number (or other suitable identifying information) associated with inbound communication 204a. Database server 126 may store a database record associated with the telephone number or other suitable identifying information. In certain embodiments, at step 210 database server 126 responds to the query of step 208 with information about an entity (e.g., an individual or company) associated with the telephone number (or other identifying information). The information provided by database server 126 may comprise some or all of the information related to the source of the inbound communication described above in relation to FIG. 1.

At step 212, service platform 106 identifies one or more configuration parameters associated with a destination of inbound communication 204a. In certain embodiments, the destination of inbound communication 204a is associated with client 130, which may be a client of the call center utilizing service platform 106. In certain embodiments, the one or more configuration parameters may indicate that client 130 is to be notified when inbound communications directed to the destination (e.g., inbound communication 204a) are received at service platform 106.

At step 216, service platform 106 routes the inbound communication to an agent associated with the call center to establish communication session 218. In the example embodiment of FIG. 2, the agent associated with the call center comprises an agent associated with operator station 108. It should be understood, however, that the present disclosure is not limited to the example embodiment of FIG. 2. For example, in certain embodiments, the agent associated with the call center may comprise a speech-enabled intelligent script. In certain embodiments, service platform 106 may be configured to assign a unique identifier to communication session 218, for example at step 214.

At step 220, service platform 106 sends, to client 130 based on the one or more configuration parameters associated with the destination of inbound communication 204a, a notification that inbound communication 204a was received at service platform 106. The notification may identify the source of inbound communication 204a. In certain embodiments, the notification identifies the source of inbound communication 204a using the information obtained from database server 126 at step 210 described above.

In certain embodiments, the notification may comprise a link enabling client 130 to request to join communication session 218. In such a scenario, at step 222 service platform 106 may receive, from client 130, a request to join the communication session. In certain embodiments, service platform 106 may join client 130 in communication session 218 at step 224, for example as described above in relation to FIG. 1. In certain embodiments, the request to join communication session 218 from client 130 may comprise the unique identifier assigned to communication session 218 at step 214.

In the example embodiment of FIG. 2, inbound communication 204a is a first inbound communication. At step 226, a second inbound communication 204b is subsequently received at service platform 106. At step 228, service platform 106 determines a source of second inbound communication 204b. At step 230, service platform 106 identifies one or more configuration parameters associated with a destination of second inbound communication 204b. In the example embodiment of FIG. 2, the destination of second inbound communication 204b may be associated with client 130, which may be a client of the call center utilizing service platform 106. In certain embodiments, the one or more configuration parameters may indicate that that subsequent inbound communications from the same source should be routed to client 130 instead of the agent.

At step 232, service platform 106 determines that the source of second inbound communication 204b is the same as the source of first inbound communication 204a. In certain embodiments, the one or more configuration parameters may indicate that subsequent inbound communications from the same source that are received within the predetermined amount of time should be routed to client 130 instead of operator station 108. In such a scenario, service platform 106 may be configured to determine at step 234 that second inbound communication 204b was received at service platform 106 within a predetermined amount of time after first inbound communication 204a was received at service platform 106.

At step 236, service platform 106 routes second inbound communication 204b to client 130 instead of the agent based on the one or more configuration parameters associated with the destination of second inbound communication 204b.

Figure 3:
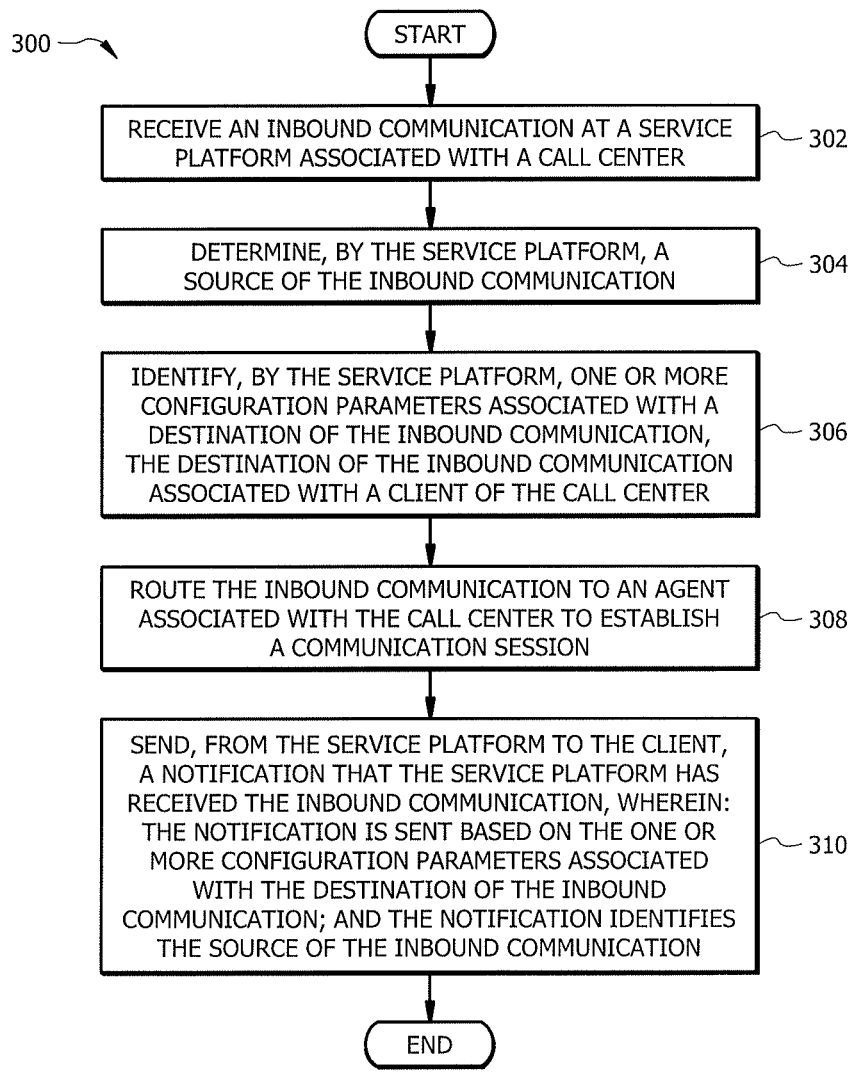
FIG. 3 is a flow diagram of an exemplary method for communications processing, in accordance with certain embodiments.

FIG. 3 is a flow diagram of an exemplary method 300 for communications processing, in accordance with certain embodiments. In the example embodiment of FIG. 3, the method is performed by a service platform associated with a call center (e.g., service platform 106 described above in relation to FIG. 1). In certain embodiments, the steps of method 300 may be performed by an applications server of the service platform (e.g., applications server 120 described above in relation to FIG. 1), alone or in combination with one or more other elements of the service platform (e.g., softswitch server 122, resource server 124, database server 126, and/or web server 128 described above in relation to FIG. 1).

Method 300 begins at step 302, where the service platform receives an inbound communication. In certain embodiments, the inbound communication may comprise one of: a phone call; a video conference call; a text message; and an e-mail.

At step 304, the service platform determines a source of the inbound communication. In certain embodiments, determining the source of the inbound communication may comprise: determining, by the service platform, a telephone number associated with the inbound communication; and accessing, by the service platform, a database record associated with the telephone number, the database record comprising information about an entity associated with the telephone number.

At step 306, the service platform identifies one or more configuration parameters associated with a destination of the inbound communication, the destination of the inbound communication associated with a client of the call center. In certain embodiments, the one or more configuration parameters may indicate that the client is to be notified when inbound communications directed to the destination are received at the service platform.

At step 308, the service platform routes the inbound communication to an agent associated with the call center to establish a communication session. In certain embodiments, the agent associated with the call center may comprise one of: an operator; and a speech-enabled intelligent script.

At step 310, the service platform sends, to the client, a notification that the service platform has received the inbound communication. The notification may be sent based on the one or more configuration parameters associated with the destination of the inbound communication. The notification may identify the source of the inbound communication. In certain embodiments, the notification may identify the source of the inbound communication using the information about the entity.

In certain embodiments, the notification may comprise a link enabling the client to request to join the communication session. The method may comprise receiving, from the client, a request to join the communication session. The method may further comprise joining the client in the communication session.

In certain embodiments, the method may comprise assigning, by the service platform, a unique identifier to the communication session. The request to join the communication session may comprise the unique identifier.

In certain embodiments, the inbound communication may be a first inbound communication. The method may comprise subsequently receiving a second inbound communication at the service platform associated with the call center. The method may comprise determining, by the service platform, a source of the second inbound communication. The method may comprise identifying, by the service platform, one or more configuration parameters associated with a destination of the second inbound communication, the destination of the second inbound communication associated with the client of the call center. The method may comprise determining, by the service platform, that the source of the second inbound communication is the same as the source of the first inbound communication. The method may comprise routing the second inbound communication to the client instead of the agent based on the one or more configuration parameters associated with the destination of the second inbound communication.

In certain embodiments, the method may comprise determining that the second inbound communication was received within a predetermined amount of time after the service platform received the first inbound communication. The one or more configuration parameters may indicate that subsequent inbound communications from the same source that are received within the predetermined amount of time should be routed to the client instead of the agent.

In certain embodiments a computer program, computer program product or computer readable storage medium comprises instructions which when executed on a computer perform any of the embodiments disclosed herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A client device, comprising:
a memory; and
processing circuitry coupled to the memory, the processing circuitry configured to:
configure one or more configuration parameters, the one or more configuration parameters comprising one or more preferences for notifications concerning inbound communication;
receive, from a service platform associated with a call center, a notification that an inbound communication was received at the call center, the notification identifying a source of the inbound communication, wherein the notification comprises a link enabling a user of the client device to request to join an ongoing communication session established with an agent associated with the call center;
send a request to join the ongoing communication session in response to the user of the client device selecting the link; and
join the ongoing communication session, wherein the one or more configuration parameters indicate a preference that subsequent inbound communications from the same source received within a predetermined amount of time shall be routed to the client device instead of the agent.

2. The client device of claim 1, wherein:
the ongoing communication session is associated with a unique identifier; and
the request to join the ongoing communication session comprises the unique identifier.

3. The client device of claim 1, wherein the one or more configuration parameters indicate a preference that the client device is to be notified when one or more inbound communications are received at the call center.

4. The client device of claim 1, wherein:
the inbound communication is a first inbound communication; and
the processing circuitry is further configured to:
receive, within a predetermined amount of time after the first inbound communication, a second inbound communication at the client device, a source of the second inbound communication being the same as the source of the first inbound communication, the second inbound communication routed to the client device by the service platform instead of the agent based on one or more configuration parameters.

5. The client device of claim 1, wherein the agent associated with the call center comprises one of:
an operator; and
a speech-enabled intelligent script.

6. The client device of claim 1, wherein the inbound communication comprises one of:
a phone call;
a video conference call;
a text message; and
an e-mail.

7. A method performed by a client device, comprising:
configuring one or more configuration parameters, the one or more configuration parameters comprising one or more preferences for notifications concerning inbound communication;
receiving, from a service platform associated with a call center, a notification that an inbound communication was received at the call center, the notification identifying a source of the inbound communication, wherein the notification comprises a link enabling a user of the client device to request to join an ongoing communication session established with an agent associated with the call center;
sending a request to join the ongoing communication session in response to the user of the client device selecting the link; and
joining the ongoing communication session, wherein the one or more configuration parameters indicate a preference that subsequent inbound communications from the same source received within a predetermined amount of time shall be routed to the client device instead of the agent.

8. The method of claim 7, wherein:
The ongoing communication session is associated with a unique identifier; and
the request to join the communication session comprises the unique identifier.

9. The method of claim 7, wherein the one or more configuration parameters indicate a preference that the client device is to be notified when one or more inbound communications are received at the call center.

10. The method of claim 7, wherein:
the inbound communication is a first inbound communication; and
the method comprises receiving, within a predetermined amount of time after the first inbound communication, a second inbound communication at the client device, a source of the second inbound communication being the same as the source of the first inbound communication, the second inbound communication routed to the client device by the service platform instead of the agent based on one or more configuration parameters.

11. The method of claim 7, wherein the agent associated with the call center comprises one of:
an operator; and
a speech-enabled intelligent script.

12. The method of claim 7, wherein the inbound communication comprises one of:
a phone call;
a video conference call;
a text message; and
an e-mail.

13. A non-transitory computer-readable medium comprising instructions that, when executed by a processor, are configured to perform a method, the method comprising:
configuring one or more configuration parameters, the one or more configuration parameters comprising one or more preferences for notifications concerning inbound communication;
receiving, at a client device from a service platform associated with a call center, a notification that an inbound communication was received at the call center, the notification identifying a source of the inbound communication, wherein the notification comprises a link enabling a user of the client device to request to join an ongoing communication session established with an agent associated with the call center, the ongoing communication session associated with a unique identifier;
sending a request to join the ongoing communication session in response to the user of the client device selecting the link, the request comprising the unique identifier; and
joining the communication session, wherein the one or more configuration parameters indicate a preference that subsequent inbound communications from the same source received within a predetermined amount of time shall be routed to the client device instead of the agent.

14. The medium of claim 13, wherein:
the one or more configuration parameters indicate a preference that the client device is to be notified when one or more inbound communications are received at the call center.

15. The medium of claim 13, wherein:
the inbound communication is a first inbound communication; and
the method comprises receiving, within a predetermined amount of time after the first inbound communication, a second inbound communication at the client device, a source of the second inbound communication being the same as the source of the first inbound communication, the second inbound communication routed to the client device by the service platform instead of the agent based on one or more configuration parameters.

\* \* \* \* \*